United States Patent
Benelisha et al.

(10) Patent No.: US 7,890,551 B2
(45) Date of Patent: Feb. 15, 2011

(54) ACTIVE FILE CHANGE NOTIFICATION

(75) Inventors: Stephen Benelisha, Oakview, CA (US);
Brent Miller, Santa Clara, CA (US);
Barnaby Falls, Alameda, CA (US);
Chien Nguyen, Antioch, CA (US);
Amod P. Bodas, Cupertino, CA (US)

(73) Assignee: NetApp, Inc., Sunnyvale, CA (US)

( * ) Notice: Subject to any disclaimer, the term of this patent is extended or adjusted under 35 U.S.C. 154(b) by 439 days.

(21) Appl. No.: 10/341,811

(22) Filed: Jan. 13, 2003

(65) Prior Publication Data

US 2003/0144990 A1 Jul. 31, 2003

Related U.S. Application Data

(60) Provisional application No. 60/349,765, filed on Jan. 15, 2002.

(51) Int. Cl.
*G06F 12/00* (2006.01)
*G06F 17/30* (2006.01)

(52) U.S. Cl. ..................................................... 707/821

(58) Field of Classification Search ................. 707/203, 707/204, 781, 822, 821
See application file for complete search history.

(56) References Cited

U.S. PATENT DOCUMENTS

| | | | |
|---|---|---|---|
| 5,163,131 A | 11/1992 | Row | |
| 5,287,504 A * | 2/1994 | Carpenter et al. | 1/1 |
| 5,437,029 A * | 7/1995 | Sinha | 707/200 |
| 5,627,972 A * | 5/1997 | Shear | 709/246 |
| 5,680,586 A * | 10/1997 | Elkins et al. | 703/27 |
| 5,745,903 A * | 4/1998 | Huan | 707/201 |
| 5,778,388 A | 7/1998 | Kawamura et al. | |
| 5,881,311 A * | 3/1999 | Woods | 710/4 |
| 5,898,336 A * | 4/1999 | Yamaguchi | 327/157 |
| 5,926,816 A | 7/1999 | Bauer et al. | |
| 6,064,656 A * | 5/2000 | Angal et al. | 370/254 |
| 6,067,541 A | 5/2000 | Raju et al. | |
| 6,189,016 B1 | 2/2001 | Cabrera et al. | |
| 6,209,124 B1 * | 3/2001 | Vermeire et al. | 717/114 |
| 6,393,434 B1 * | 5/2002 | Huang et al. | 707/200 |
| 6,424,966 B1 | 7/2002 | Meyerzon et al. | |
| 6,499,039 B1 * | 12/2002 | Venkatesh et al. | 707/204 |
| 6,714,951 B2 * | 3/2004 | Bills et al. | 707/202 |
| 2002/0083151 A1 * | 6/2002 | Adams et al. | 709/217 |

OTHER PUBLICATIONS

U.S. Appl. No. 60/349,765, entitled Active File Change Notification, filed Jan. 15, 2002 by Stephen Benelisha.

* cited by examiner

*Primary Examiner*—Charles E Lu
(74) *Attorney, Agent, or Firm*—Cesari and McKenna, LLP

(57) ABSTRACT

Techniques and systems, including computer program products, for providing timely file change notification. In general, in one implementation, the technique includes a recorder that records changes to one or more files in a file system and a broker that receives and responds to change notification request from external applications. The recording of changes can be system-initiated and can pertain to changes occurring anywhere in the file system. The recorder and broker can perform asynchronously from each other and can persist independently of the external applications.

37 Claims, 1 Drawing Sheet

ACTIVE FILE CHANGE NOTIFICATION

This application claims the priority of U.S. Provisional Application Ser. No. 60/349,765, filed Jan. 15, 2002, which is hereby incorporated by reference in its entirety.

BACKGROUND

This invention relates to file systems and file change notification.

Files of a file system in a computer system environment are often subject to change. Such changes will be referred to as file changes and include creating a new file, deleting an existing file, and modifying an existing file. Often, it is necessary to notify applications external to a file system of file changes in the file system.

Information technology ("IT") applications typically use a so-called "spidering mechanism" to discover changed files. Unfortunately, spidering mechanisms are slow and, consequently, there is a delay, which may be several hours, before applications discover that files have changed. The delay in the discovery of a changed file is referred to as latency.

SUMMARY

The present invention provides methods and systems, including computer program products, for file change notification.

In general, in one aspect, a system in accordance with the invention features a recorder that is operable to detect changes to one or more files in a file system and record the changes in a change log; and a broker that is operable to receive a request to deliver change notifications to one or more external applications and respond to the request by retrieving records from the change log and distributing the records to the one or more external applications. The recorder is operable to detect and record changes independent of whether a change notification request has been received by the broker.

The invention can be implemented to include one or more of the following advantageous features. The recorder operates asynchronously from the broker. The broker distributes changes to an external application including changes detected before the notification request was made. The broker buffers non-distributable records until the records can be distributed. The recorder records the changes in a non-application specific format; and the broker converts one or more of the records into an application-specific format before distributing the records to the external application. The broker determines whether a file is eligible for change notification and distributes only the records that correspond to files that are eligible for change notification. The broker filters out redundant records or records that are soon to be rendered obsolete.

In general, in another aspect, a method includes receiving a request to deliver change notifications to one or more external applications. The method includes responding to the request by retrieving records from a change log and distributing the records to the one or more external applications. The records contain detected changes to one or more files in a file system. Distributing the records includes distributing records containing changes that were detected prior to when the request was received.

In general, in another aspect, a computer program product is operable to cause data processing apparatus to receive a request to deliver change notifications to one or more external applications. The product is operable to cause a data processing apparatus to respond to the request by retrieving records from a change log and distributing the records to the one or more external applications. The records contain detected changes to one or more files in a file system. Distributing the records includes distributing records containing changes that were detected prior to when the request was received. The product is tangibly embodied in an information carrier.

The invention can be implemented to realize one or more of the following advantages. A system in accordance with the invention provides active notification of file changes. That is, the system does not need prompting. The system replaces regularly scheduled maintenance operations, sometimes referred to as cronjobs or batch operations, such as, for example, backups and search engine indexing. The system balances resources and reduces the need for personnel maintaining the system. The system provides low latency for operations such as incremental backups and search engine updates. The load on system resources can be reduced because there is no need to scan all files looking for files that have changed. The system is platform and application independent and works for all file types and all applications that save files or scan files or directories for changes. The system adaptively manages load and includes modifiable policies for load management. The system operates out of band and does not consume computing resources of file systems that are monitored by the system. Out of band refers to processing that does not take place serially with file read or write operations. The system is scalable. The system can make use of the log files of the file system being monitored. Consequently, there is no need to create a new protocol for logging data.

The details of one or more implementations of the invention are set forth in the accompanying drawings and the description below. Other features, aspects, and advantages of the invention will be apparent from the description, drawings, and claims.

DESCRIPTION OF DRAWINGS

Like reference symbols in the various drawings indicate like elements.

DETAILED DESCRIPTION

Figure 1:
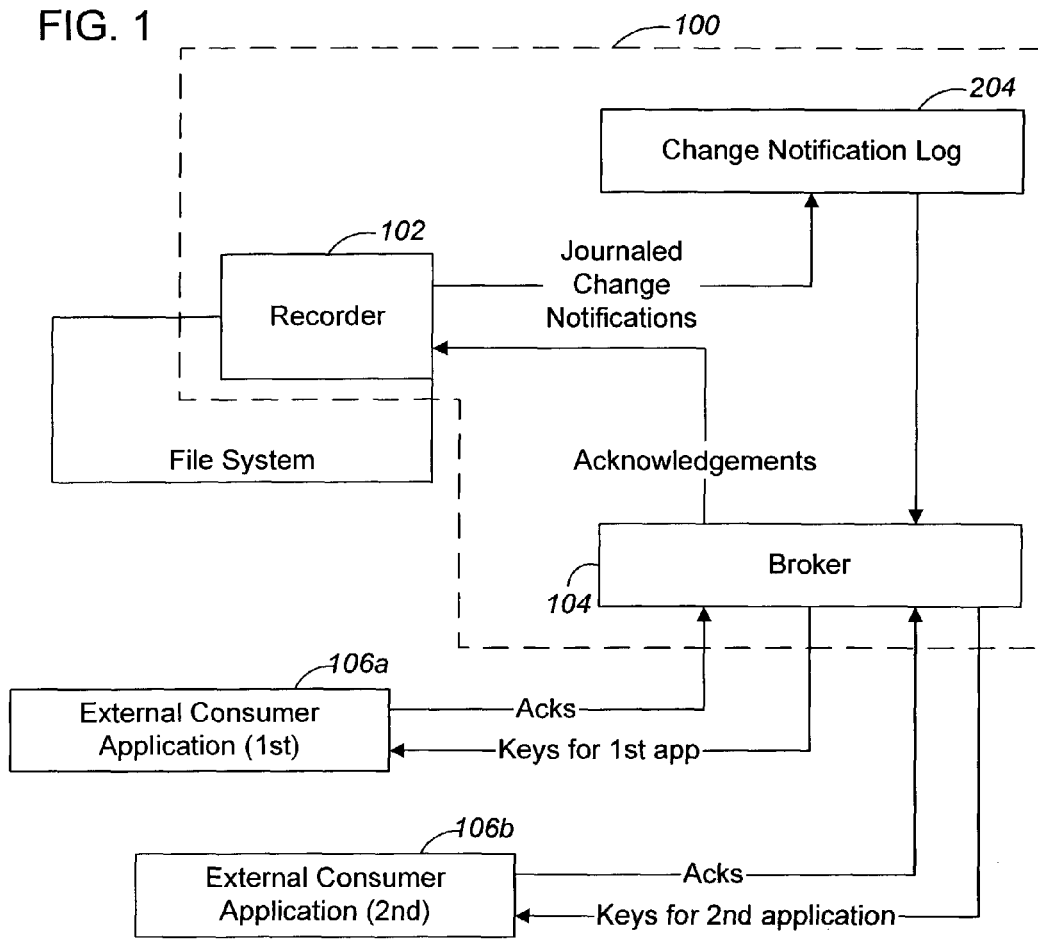
FIG. 1 shows a notification system in accordance with the invention.

Any application that scans files and directories for changes can benefit from a file change notification system in accordance with the invention. Two examples of such applications are search engine applications and tape backup applications, which will be described below.

Search Engine Application Example

Search engines such as the Verity K2 Enterprise product allow users to perform full-featured keyword searches of documents stored on any given system. The documents can be in any popular document format (e.g., text, Microsoft Word or Excel, and Adobe PDF). An index of the documents can be created in order to facilitate searching. An index can be implemented as a directory tree full of files that contain data about what words the documents contain and what files those words came from. Every document must be indexed each time the document is changed.

In conventional systems, search engines do not know when files need to be indexed. Some external process has to generate a list of files for the search engine to process. For large directory trees containing many files, a program referred to as a file/directory spider (or "crawler"), or simply a "spider," must be used to check and compare each file against the index to see if the index data for the file is up to date. If the file's index data is out of date, then the file is scheduled for indexing. The spider program is a slow and expensive process that is usually executed on a nightly basis to synchronize changed files with the index. As a consequence, file changes are not identified for uses (such as searching) for periods up to 24 hours. This latency is a generally accepted limitation of search technology.

A system in accordance with the invention solves the described latency problem. The system sends a change notification message to the indexer when the file is saved to disk. This action results in the file being available to the search engine in times that are less than a minute. The index is also self-maintaining, no longer needing an overnight spider process.

Nightly Tape Backup Application Example

Nightly incremental backups are ubiquitous throughout IT installations. In a normal incremental backup operation, properties of current files in a given file system are examined and compared to properties of backed up versions of the files that already exist. If the properties of a current file indicate that the current file is newer than the backed up version of the file, the current file backed up. When performing nightly backups, there is latency between when a file is modified and when the file is backed up. This latency may be as long as 24 hours. Furthermore, since all files are examined and backed up in the same continuous operation, the network and system performance will be greatly reduced during the backup time.

In a system in accordance with the invention, a file that is modified by a user can be backed up within seconds from the moment the file was saved. In response to the notification, the backup program backs the file up. As a consequence, a low back up latency is achieved, which reduces the likelihood of some system failure causing loss of work. Furthermore, the workload on system resources is evenly balanced throughout the day, which reduces the impact of backup operations on system performance and eliminates the work of crawling unchanged files.

FIG. 1 shows a notification system 100 for providing notification of file changes of files in a file system to external applications 106a and 106b. A search engine indexer is an example of an external application. The external applications 106a and 106b consume the notifications provided by the system 100.

The notification system 100 includes a recorder module 102 for recording notifications of file changes that occur within a file system and a broker module 104 for distributing the notifications to one or more external applications that have requested file change notification.

The recorder 102 can be implemented to act as a component of the file system in detecting file system events for which change notifications should be generated. This can be done in a variety of ways, according to the design of the file system and the interfaces existing between the file system and other system components. For example, the recorder can be implemented by modifying file system code or by inserting the recorder functionality as a layer between an operating system and a file system.

The recording of file change notifications can be system-initiated. In other words, the recorder 102 can begin recording file change notifications even before a file change notification request has been received from an external application.

The notifications can pertain to file changes occurring anywhere in the file system, i.e., not just within a certain directory of the file system. However, the system can also be configured so that only certain notifications are distributed to external applications, such as only notifications corresponding to certain files. In one implementation, a parameter associated with a file indicates whether or not the file is eligible for change notification. Alternatively, the system can be configured to determine eligibility based on pre-defined policies (e.g., a policy specifying that only files located in a certain partition of a disk are eligible for change notification).

To reduce the impact on the file system performance, the information recorded can be minimal. For example, it is not necessary to record the source of or reason for the change. Nor is it necessary to record a sequential filename or fileID for each changed file. The change notifications can be recorded in a simple and generic format that is not application specific.

The broker 104 can be configured to retrieve the recorded change notifications and distribute the notifications to the external applications. When the broker retrieves a generic notification, the broker can add application-specific information or otherwise translate the notifications into an application-specific format such as a key for an indexer application.

Distributing the notifications can include filtering out file changes that are redundant, soon to be rendered obsolete, or too costly to process. This feature is further described in the description of adaptive load management, below.

The broker 104 can continue to operate even when one or more of the external applications 106 are no longer running. If distribution to a particular external application 106 fails, for example because the external application has terminated, the broker 104 can store the undeliverable notifications until the external application starts up again.

Recording and distributing notifications can occur out of band from other file server operations so as to have little or no impact on file server performance. For example, the file change can be written to disk immediately and need not be delayed while notification of the file change is being performed. The recording and distribution can also occur out of band from each other. The recorder module 102 can continue to log notifications independent of whether the broker module 104 is executing.

In response to increased demand, the notification system 100 can scale up resources (hardware and/or software) in order to deliver desired latency and performance. For example, multiple broker modules 104 can work in parallel to support multiple external applications. Notification can apply to all file types (e.g., text files, Microsoft Office files, Adobe PDF files, and HTTP/HTML files), including customized file types (e.g., news feeds and financial data streams).

The file system can be any conventional file system including, for example, file systems commonly used with the Windows and UNIX operating systems. The notification system can generally operate on any computing system that provides remote file system access, including, for example, those that support the NFS (network file system) or CIFS (common internet file system) protocols. The notification system 100 is a non-proprietary system that can be ported to any of the described file systems or operating systems.

The file system can be implemented in any way. For example, it can be resident on a single computer and implemented integrally with the operating system of the computer; it can be implemented on dedicated hardware; it can be distributed across multiple computers; or it can be implemented on special-purpose hardware, such as is described in U.S. Pat. No. 5,163,131 for Parallel I/O Network File Server Architecture.

One example of data flow within the notification system 100 will now be described. The recorder 102 generates change notifications ("CNs") according to the actions affecting files in the file system. These are journaled to a queue—in this example, a change notification log ("CN Log") 204—that the broker 104 reads from. The CNs are kept in the queue until the broker acknowledges them. The broker maintains various information about the file system, as described elsewhere in this specification, and using this information and the incoming CNs, generates keys specific to external applications being notified of file system changes. Keys are change notifications formatted for the particular applications to which they are directed. To avoid loss of change information from system or communication failures, the broker keeps its CNs until the corresponding keys have been acknowledged by all the receiving applications.

The recorder 102 can detect file changes occurring anywhere in the file system. For every file change that occurs in the file system, the recorder 102 records a file change notification in the CN Log 204. The CN Log 204 can be implemented as a queuing buffer, which in one implementation takes the form of one or more log files located in the root of a given partition of the file system. Each change notification can be structured data, which contains a file identifier ("FileID") and an event (such as create, modify, and delete). All log files of the CN Log 204 can be located under the root of the file system being logged, e.g., in a directory at ROOT/axcnlog.d. The axcnlog.d directory and all log files within it can be owned by root. Log files can be written with data little-endian and 4-byte offsets. When a set of regular files is used for the log, clients can access the log using existing file access protocols, such as NFS (Network File System) and CIFS (Common Internet File System). The broker 104 can remove the notification files or perform similar file operations to indicate notifications that have been successfully received for processing.

Table 1 below shows an example of the structure of the CN Log 204. The log files of the CN log 204 can occupy a pre-allocated chunk of space, for example, in the log files' own partition or as a pool of files of constant length. In one implementation, the log files are never removed from the pool but simply have new data written into them when needed.

TABLE 1

```
typedef enum {
    CNLOG_EOF=0, /* mark end of a cnlog file */
    CNLOG_ROOT=1, /* root info, first entry when file system
                    mounted */
    CNLOG_SETATTR=2,
    CNLOG_WRITE=3,
    CNLOG_CREATE=4,
    CNLOG_MKDIR=5,
    CNLOG_SYMLINK=6,
    CNLOG_MKNOD=7,
    CNLOG_REMOVE=8,
    CNLOG_RMDIR=9,
    CNLOG_RENAME=10,
    CNLOG_LINK=11,
    CNLOG_COMMIT=12,
    CNLOG_SETSD=13, /* ACL change */
    CNLOG_MAXOP=14 /* Sentinel marking highest opcode+1 */
} cnlog_opcode_t;
typedef struct {
    uint32_t uid;    /* effective user id */
    uint32_t gid;    /* effective group id */
    uint32_t ruid;   /* real user id */
    uint32_t rgid;   /* real group id */
} cnlog_cred_t;
typedef struct {
    uint32_t         magic;
    cnlog_opcode_t   opcode;
    uint32_t         fsid[2];
    cnlog_cred_t     cred;
    time_t           logtime;
} cnlog_          cmnhdr_t;
typedef struct {
```

TABLE 1-continued

```
    cnlog_int64_t   inode;
    cnlog_int64_t   gen_no;
} cnlog_fid_t;
typedef struct {
    uint32_t        type;
    uint32_t        mode;
    uint32_t        nlink;
    uint32_t        uid;
    uint32_t        gid;
    cnlog_int64_t   size;
    cnlog_int64_t   nblocks;
    time_t          atime;
    time_t          mtime;
    time_t          ctime;
    time_t          crtime;    /* creation time */
    uint32_t        smbattr;   /* smb extended file attributes */
} cnlog_vattr_t;
/* The following structures will be written by the FS into the cnlog files */
typedef struct {
    cnlog_cmnhdr_t  hdr;
    cnlog_fid_t     fileid;
    cnlog_int64_t   offset;
    uint32_t        len;
    uint32_t        ioflag;
    cnlog_vattr_t   attrs;
} cnlog_write_t;
typedefstruct {
    cnlog_cmnhdr_t  hdr;
    cnlog_fid_t     parent_dir_id;
    clog_vattrt_t   parent_dir_attrs;
    cnlog_fid_t     fileid;
    cnlog_vattr_t   vattr;
    cnlog_string_t  name;
} cnlog create_t;
typedef struct {
    cnlog_cmnhdr_t  hdr;
    cnlog_fid_t     parent_dir_id;
    cnlog_vattr_t   parent_dir_attrs;
    cnlog_string_t  name;
} cnlog_remove_t;
```

In one implementation, the recorder 102 stores the CNs in a 4 k buffer before writing the CNs to disk. Alternatively, multiple 4 k buffers can be used to reduce the impact on file system performance. Every ¼ second, if there are CNs in the buffer, or if the buffer fills before ¼ second, the CNs in the buffer are written to a file and the buffer is cleared. When the buffer contains no CNs, the recorder 102 does not write to the CN Log 204. The system 100 can be configured to either use reserved disk space sufficient to guarantee some minimum number of queued pending notifications, or to store queued pending notifications on the file system itself. Behavior upon exhausting space for storing queued pending notifications can be configured as described below.

When there are no pending notifications, latency can be reduced by immediately writing all transactions into a new log file. When there are pending notifications, throughput can be increased by buffering the notifications and writing log files containing batches of notifications.

In one implementation, the first log file written is cnlog.0. Every subsequent write increments the number in the suffix (e.g., cnlog.1, cnlog.2, and so forth). After writing a predetermined maximum number of log files, e.g., 65535, the system 100 resets the file log numbering back to cnlog.0. The recorder 102 can be configured for different behaviors upon wrapping and overrunning pending cnlog.* notification files. One example of such behavior is to overwrite pending notifications so that, in the event of overflow, the oldest undelivered notifications are lost. Another example of such behavior is to spill into an auxiliary file structure until the file system disk space is exhausted. A third possibility is to throttle or block file system changes until the broker 104 has received more pending notifications.

Figure 2:
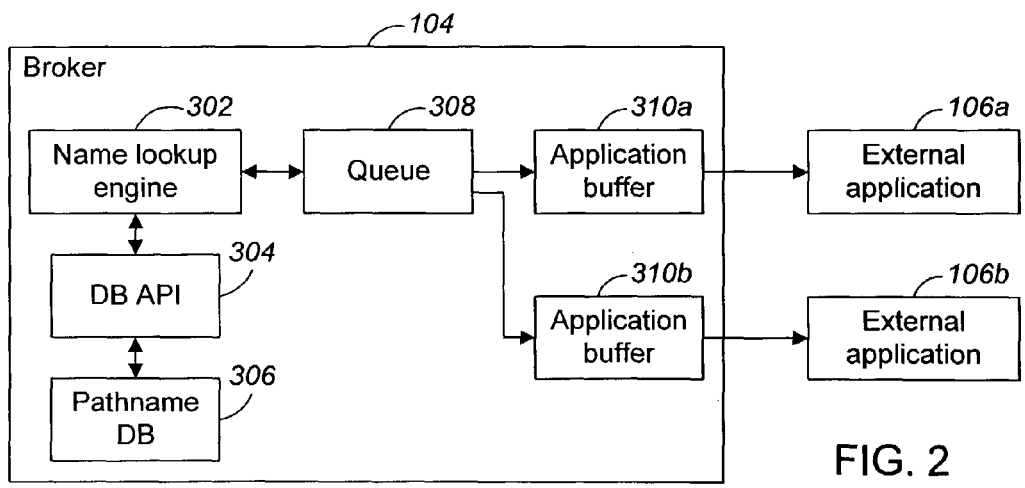
FIG. 2 shows a broker in accordance with the invention.

As shown in FIG. 2, the broker 104 can include a name lookup engine 302, a database application programming interface ("DB API") 304, a pathname database ("DB") 306, a queue 308 and one or more application buffers 310a and 310b, all within the same process space.

The name lookup engine 302 is a mechanism for storing state and using the state to resolve the identity of the changed files. This mechanism can reduce the amount of information the recorder 102 needs to store in a log entry and, furthermore, can determine, in the event that the log entries contain insufficient information, the identity of the file.

The pathname DB 306 stores structural information about the file system. The pathname DB 306 can be used to convert a fileID (e.g., an NFS file handle) to the full pathname of the file. Every file monitored by the system 100 has a corresponding pathname in the pathname DB 306, and the pathnames stored in the pathname DB 306 are relative to the root of the file system. The pathname DB 306 can be any conventional DB (e.g., those produced by the Oracle Corporation of Redwood Shores, California, Sybase, Inc. of Dublin, Calif., or MySQL AB of Sweden) and can be local or external to the broker 104. Table 2 below shows examples of signatures of modules used to access the pathname DB.

TABLE 2

1. void DBinit( ):
    Initialize the database. Call once by Broker at startup.
2. void DBclose( ):
    Close the database. Called at exit time from Broker.
3. int DBfetch(cnlog_key_t *key, cnlog_dbrec_t **data) :
    Fetch "data" corresponding to "key" which is passed in. The DBfetch API call returns error (< 0) in case of database unable to find the entry. 0 is returned for success.
4. int DBstore(cnlog_key_t *key, cnlog_dbrec_t *data);
    Store passed in data along with key into the database. Return error (< 0) for failures and 0 for success.
5. int DBdelete(cnlog_key_t *key)
    Delete key and its associated data from the database. Return error (< 0) for failures and 0 for success.
6. cnlog_key_t * DBfirstkey( ) & cnlog_key_t * DBnextkey( )
    Routines for scanning the database in sequential fashion.

The DB API 304 is a software wrapper that provides a defined interface to the pathname DB 306. The DB API 304 includes a DbPut( ) call and a DbGet( ) call. DbPut( ) accepts a string key and a fix-sized array of string values that are stored as a record. DbGet( ) accepts a string key and returns an array of string values representing the record previously stored with DbPut( ). Optionally, the DB API 304 can also support DbRecordFree( ), which accepts an array pointer previously allocated with DbGet( ) and frees the associated memory.

The queue 308 is a buffer internal to the broker module 104. The name lookup engine 302 sends processed CN entries to the queue 308 where the CN entries are stored in a general format (i.e., not specific to any particular application).

One or more application buffers 310a and 310b within queue 308 stores CNs that have been converted into application-specific format ("keys"). Table 3 below shows an example of the structure of a key.

TABLE 3 typedef struct_CNFSTRANS {
    union {
        cnlog_create_t cncreate; /*notify of create file (or directory) action*/

TABLE 3-continued cnlog_remove_t cnremove; /*notify of remove file (or directory) action*/
        cnlog_write_t cnwrite; /*notify of write or modify file action*/
    } transinfo;
    uint16_t fullnamesize;
} CNFSTRANSREC, * CNFSTRANS;

A key can include metadata information such as the offset and length of a key. The offset information allows the system 100 to determine which part of the file might have been affected by the change. The number of bytes in the full pathname is stored in the fullnamesize member because the actual string is appended to the end of this structure when the notification is stored. Table 4 below shows an example of the structure of a key configured for an indexing application.

TABLE 4 typedef struct _IDXKEY {
short operation; /* indexer operation (some enum) */
short szfullpath; /* size of indexer key incl. null */
int offsethi;/* the hi offset where the file was updated on a WRITE */
int offsetlo;/* the low offset where the file was updated on a WRITE */
int lengthhi; - the hi length of the update in the file on a WRITE.
int lengthlo; - the low length of the update in the file on a WRITE.
char fullpathname;
} IDXKEYREC, * IDXKEY;

Each application buffer can be implemented as a set of transaction files that are created in the same manner as the CN Log files. The content of each transaction file contains the full pathname and the operation for the application to perform. The integers can be written as scalars rather than a number represented as a string.

In operation, the broker 104, specifically the name lookup engine 302, accesses the file system through the NFS or another file access protocol such as CIFS. The name lookup engine 302 continuously checks for new log files and starts out by looking for the existence of the file cnlog.0. One implementation uses a Stat function call to test for the file's existence until the file is found. The Stat( ) function call is a C programming language function call that obtains information about a file named by a particular path. Read, write or execute permissions of the named file are not required for performing the Stat( ) function call, but all the directories listed in the path name leading to the file must be searchable. If no file is found, the name lookup engine 302 waits ¼ second and then checks again. When the engine finds a cnlog.N file, the name lookup engine processes the file, including moving the CN entries from the file to the queue 308. After processing, the broker 104 deletes the file, and then increments the number of the next log file for which the engine is looking, and continues checking for the next file.

If a CN entry contains insufficient information for the external application to identify the changed file or to determine its content, the name lookup engine 302 can resolve a file's identity by using CN information to look up the full pathname in the pathname DB 306. If a pathname cannot be resolved from the pathname DB 306 for any reason, the pathname is resolved by software running on the recorder 102 and the pathname DB 306 is updated with the result, as described below.

The name lookup engine 302 looks up the FS mount point from its configuration, and produces a full pathname by appending the FS pathname from the pathname DB 306 to the FS mount point.

In the event the pathname DB becomes corrupted or is not available for a notification, the name lookup engine 302 uses an alternate lookup mechanism to obtain the necessary information directly from the file system. The alternate lookup mechanism can be implemented as follows. When the broker gets a record (write/create) for which it does not have a entry in the pathname DB, the broker takes this record and hands it over to the alternate lookup mechanism. The alternate lookup mechanism contacts the file system to get complete path information along with attributes. The alternate lookup mechanism updates the pathname DB with the complete, path information. The alternate lookup mechanism can be implemented as software running just about anywhere. In one implementation, the alternate lookup mechanism runs on a host machine with sockets that enable more flexible communication than the NFS and CIFS. If the alternate lookup mechanism cannot resolve the pathname in the current FS, then the notification is aborted; in such cases, an error event can be logged and, optionally, reported to one or more of the external applications.

After processing the CN entries, the name lookup engine invokes the broker and passes it a structure carrying details of the transaction notification, minimally including a full pathname and opcode identifying what operation occurred. After the name lookup engine 302 evaluates all pathnames associated with a transaction, the broker 104 determines from its configured policy the external applications to which notifications must be distributed.

Once the broker 104 has assumed responsibility for distributing a notification, the broker 104 signals that the transaction is no longer needed in the CN Log. In one implementation, the signaling is accomplished by the pathname DB 306 removing (through NFS) the cnlog.* file. Until a successful delivery has been made to all subscribing applications, pending notification transactions may be left in the CN Log or queued locally on the broker 104. Specifically, the broker 104 can keep a local buffer for each external application identifying pending transactions for that application once the notifications have been marked received from the CN Log. The procedure will return success or fail. Upon a successful return, the name lookup engine 302 can then report or log a completed notification. Upon failure, the name lookup engine 302 stores the notification for attempted redelivery either by leaving the transaction unsent on the file system or by queuing transactions locally.

The broker 104, upon being called by the name lookup engine 302, reads notifications from the queue 308, converts the notifications into a key, and stores the key in the application buffer 310a, 310b for a specific application 106a, 106b. In one implementation, the first key is stored with a file extension number of 0. Every subsequent write increments the file extension number by 1.

In a separate thread, the broker 104 can read a transaction file of keys from the application buffer and send the keys over a bi-directional socket connection to the application. The broker 104 can flush the buffer based on a ¼ second timeout or sooner if the buffer is filled. Upon receiving a reply from the application indicating that the file was received, the broker deletes the transaction file.

To improve throughput, the broker 104 can send blocks of notifications without needing to mark them individually as finished. In one implementation, the broker 104 can dedicate one process ("Sender") to continuously sending notifications while another process ("Reader") continuously reads acknowledgements and marks notifications as received by the external application. If the Reader receives an acknowledgement indicating that certain notifications be resent, the Reader inserts the request into the Sender's workflow and the Sender interrupts its normal work to send this special request. The Reader also keeps track of the lowest unsent notification and the highest notification and does not allow an acknowledgment to arrive out of order. For even greater efficiency, the external applications can request larger blocks at a time to reduce the number of system calls to read( ). Additionally, an acknowledgement from an external application can refer to a batch of transaction files instead of just a single transaction file. In the batch implementation, the broker can keep track of the sequence of all notifications and deliver the notifications in sequence.

Fail Safe/Persistence Outside of Client

The broker 104 cannot deliver notifications to an application if the application has terminated or is not responding. However, the broker 104 can continue accumulating notifications by appending the undeliverable notifications in a queuing mechanism 308. Once the application is running again, the broker 104 will deliver those notifications before continuing to deliver the keys as usual. In this manner, the notification system persists even in absence of an application.

Load Management/Distribution Policies

In a heavy use environment, the broker 104 can become overloaded. The broker 104 can include a policy-based management layer to determine which notifications should be processed and which should simply be ignored or deleted. The policies can prevent processing of notifications, which are redundant, soon-to-be rendered obsolete, or too costly to process. For example, the broker 104 can examine a set of buffers before they are sent out to the application to avoid unnecessary work such as a sequence of create, update, remove of a temporary file. Specifically, the broker can scan buffers for any remove operations, scan, up to that point, any other operations on the same key, and remove those buffer entries if found. Multiple writes to contiguous blocks of a single file can be coalesced into a single write notification spanning the entire range of changed data.

Another example involves the situation where a particular file is changed very often, perhaps every second, or more. Perhaps this file is a log file that is being added to one line at a time. To address this situation, the broker 104 can maintain a cache of filenames and associated last update times. Every time the broker 104 receives a notification, it checks the cache for the past frequency of changes for this file. If the change is too rapid, say more that two changes in a minute, then it deletes the pending change request(s) for that file. Once the file "calms down", the broker 104 processes that last request. The thresholds for change frequency (which rates define a rapidly changing file) can be configurable depending on the function of the file system.

Recovery/Re-Sync

In the event that the external application becomes out of sync with the file system, the broker 104 can generate create events for every file in the file system, thereby having the effect of recreating the external database. This full synchronization feature can be launched manually and/or automatically as needed.

In the event any application crashes, the application, upon restarting, reestablishes a communication connection to the broker 104 and sends an identifying sequence number to establish a transaction for which the broker 104 should resume sending notifications or the application can elect to let the broker resume sending transactions from where it last left off.

The following describes applications of the system 100. The broker 104 can interface with one or more search engine indexers. Each indexer can be a "socket server" receiving transaction notifications one at a time over a socket, and submitting them in correct sequential order, in background, to VDK (Verity Development Kit, also known as K2 Developer). VDK is an API library written in C that allows programmers to incorporate Verity's search technology into their own programs/products. A collsvc process services the collection. A master process starts both the socket server and the collsvc application. This implementation enables an indexer to be fully "hands off." The notification system can completely maintain the indexer. Moreover, the notification system can provide search-available files at very low latency—a matter of seconds instead of hours or days.

The broker 104 can notify a client application about file changes and the client application can invoke a virus scanning software, which accepts command line filename inputs. The file system can prevent access to the changed file until the file has been scanned. The notification system 100 can process CGI ("Common Gateway Interface") or Java scripting, thereby allowing users to create their own active notification scripts. The active notification scripts can include user-defined logic for evaluating files and routing them. For example, the active notification scripts can include logic for providing streaming of news or financial data. The processing can occur by "stream segments" where multiple filters hand notifications along a stream and any particular segment can decide to handle the notification as it wants or to add it to the stream.

The notification system 100 can provide content management functions based on unstructured contents documents, XML tag extraction, Microsoft Office property sheets, file/subdirectory names, user level preferences, and administrator preferences. For example, a file may contain an XML tag indicating that a backup should be made of the file every time the file is changed. When the notification system detects that this file has changed, it can automatically backup the file.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations of the invention have been described. Nevertheless, it will be understood that various modifications may be made without departing from the spirit and scope of the invention. For example, the name lookup mechanism has been described as occurring on the fly as the CN entries are copied from the CN Log 204 into the queue 308. However, the name lookup mechanism can instead occur at a different stage, for example, as the notifications are being read out of the queue 308. A recorder can be implemented in each of multiple file systems where multiple file systems are implemented in a computing environment. A broker can be implemented for each recorder, or one broker can serve multiple recorders.

What is claimed is:

1. A computer system, comprising:
   a cache of the computer system configured to store a file and change times of the file;

a network interface of the computer system configured to communicate with an external application;
a persistent storage of the computer system configured to store the file for the external application; and
a processing logic of the computer system operatively coupled to the cache, the network interface and the persistent storage, the processing logic configured to,
detect a change to the file and record, as a change record, the change to the file in a change log of the computer system,
in response to detecting the change, check the change times of the file and determine whether a frequency of one or more changes to the file exceeds a threshold;
determine whether the change record will be processed for a change notification to the external application in response to not exceeding the threshold, or whether the change record will be ignored and not processed for the change notification in response to exceeding the threshold,
in response to determining that the change record will be processed for the change notification,
determine whether the change record is one of included in a pathname database of the computer system or excluded from the pathname database, and in response to being excluded from the pathname database,
resolve a pathname for the change record,
retrieve the change record in response to resolving the pathname, and
distribute the change record to the external application.

2. The computer system of claim 1, wherein the processing logic is further configured to distribute the change record to the external application for the detected change before a request for the change is made.

3. The computer system of claim 1, wherein the processing logic is further configured to buffer non-distributable change records until the non-distributable change records can be distributed.

4. The computer system of claim 1, wherein the processing logic is further configured to record changes for files that are located anywhere in a file system of the computer system.

5. The computer system of claim 1, wherein the processing logic is further configured to record the change in a non-application specific format and further configured to convert the change record into an application-specific format before distributing the change records to the external application.

6. The computer system of claim 1, wherein the cache comprises the record log.

7. The computer system of claim 1, wherein the system utilizes the network file system (NFS) protocol.

8. The computer system of claim 1, wherein the processing logic is further configured to detect changes to one or more files in multiple different file systems.

9. The computer system of claim 8, wherein one or more of the multiple different file systems comprises a UNIX file system.

10. The computer system of claim 1, wherein the processing logic is further configured to filter out redundant change records.

11. The computer system of claim 1, wherein the processing logic is further configured to filter out change records that are soon to be rendered obsolete.

12. The computer system of claim 1, wherein the processing logic is further configured to distribute the change record to the external application even if the change is detected while the external application is not running.

13. A method for a computer to operate a storage operating system, comprising:
maintaining, in persistent storage of the computer, a file for an external application and change times of the file;
detecting a change to the file and recording the change as a change record in a change log of the computer;
in response to detecting the change, checking the change times of the file and determining whether a frequency of one or more changes to the file exceeds a threshold;
determining, by the computer, whether the change record in the change log will be processed for a change notification to the external application in response to not exceeding the threshold, or whether the change record will not be processed for the change notification in response to exceeding the threshold;
in response to determining that the change record will not be processed for the change notification, denying a request to deliver the change notification to the external application;
in response to determining that the change record will be processed for the change notification, responding to the request by retrieving the change record from the change log;
determining whether the change in the change log is one of included in a pathname database of the computer or excluded from the pathname database, and in response to being excluded from the pathname database,
resolving a pathname for the change in the change log;
retrieving the change in the change log in response to resolving the pathname; and
distributing the change record in the change log to the external application.

14. The method of claim 13, further comprising:
buffering non-distributable change records until the non-distributable change records can be distributed.

15. The method of claim 13, further comprising:
converting the change record from a generic format into an application specific format before distributing the change record to the external application.

16. The method of claim 13, further comprising:
filtering out redundant change records.

17. The method of claim 13, further comprising:
filtering out change records that are obsolete.

18. A computer readable storage medium containing executable program instructions executed by a processor, comprising:
program instructions that maintain, in persistent storage of the computer, a file for an external application and change times of the file;
program instructions that detect a change to the file and program instructions that record the change as a change record in a change log of the computer;
in response to detecting the change, program instructions that check the change times of the file and determine whether a frequency of one or more changes to the file exceeds a threshold;
program instructions that determine whether the change record in the change log will be processed for a change notification to the external application in response to not exceeding the threshold, or whether the change record will not be processed for the change notification in response to exceeding the threshold;
in response to determining that the change record will not be processed for the change notification, program instructions that deny a request to deliver the change notification to the external application;

in response to determining that the change record will be processed for the change notification, program instructions that respond to the request by retrieving the change record from the change log;

program instructions that determine whether the change in the change log is one of included in a pathname database of the computer or excluded from the pathname database, and in response to being excluded from the pathname database, program instructions that resolve a pathname for the change in the change log;

program instructions that retrieve the change in the change log in response to resolving the pathname; and program instructions that distribute the change record in the change log to the external application.

19. A method for operating a computer system, comprising:

maintaining a cache of a computer for a file and change times of the file;

maintaining the file for an external application;

detecting a change to the file and recording the change to a change log of the computer;

in response to detecting the change, checking the change times and determining whether a frequency of one or more changes to the file exceeds a threshold;

determining, by the computer, whether the change in the change log will be processed for a change notification to the external application in response to not exceeding the threshold, or whether the change in the change log will not be processed for the change notification in response to exceeding the threshold;

in response to determining that the change in the change log will not be processed for the change notification, ignoring the change in the change log; and in response to determining that the change in the change log will be processed for the change notification:

determining whether the change in the change log is one of included in a pathname database of the computer or excluded from the pathname database, and in response to being excluded from the pathname database, resolving a pathname for the change in the change log;

retrieving the change in the change log in response to resolving the pathname; and distributing the change in the change log to the external application.

20. The method of claim 19, further comprising:

detecting and the recording of the change by a recorder of the computer;

receiving a request by the external application for the change and the distributing the change by a broker of the computer; and operating the recorder and the broker asynchronously.

21. The method of claim 20, further comprising:

distributing the change even if the change is detected before the request is made by the external application.

22. The method of claim 19, further comprising:

buffering non-distributable changes recorded in the change log until the non-distributable changes can be distributed.

23. The method of claim 19, further comprising:

communicating with the external application in a format specific to the external application.

24. The method of claim 19, further comprising:

detecting the change in a plurality of different file systems, each file system using a file system specific format.

25. The method of claim 19, wherein the cache comprises the change log.

26. A computer implemented method, comprising:

maintaining a cache of a computer of a data object and change times of the data object;

recording, as a change record in a change log of a computer, a change to the data object in a generic format;

in response to detecting the change, checking the change times of the data object and determining whether a frequency of one or more changes to the data object exceeds a threshold;

determining, by the computer, whether the change record will be processed for a change notification to an external application in response to not exceeding the threshold, or whether the change record will not be processed for the change notification in response to exceeding the threshold;

in response to determining that the change record will not be processed for the change notification, deleting the change record; and in response to determining that the change record will be processed for the change notification, responding by:

determining whether the change record is one of included in a pathname database of the computer or excluded from the pathname database, and in response to being excluded from the pathname database, resolving a pathname for the change record in the pathname database;

retrieving, from the change log, the change record in response to resolving the pathname;

converting the change record from the generic format into an application-specific format of the external application; and distributing the change record to the external application.

27. The computer implemented method of claim 26, further comprising:

buffering non-distributable change records until the non-distributable change records can be distributed.

28. The computer implemented method of claim 26, further comprising:

filtering out change records that are redundant or obsolete.

29. The computer implemented method of claim 26, wherein the cache comprises the change log.

30. The computer implemented method of claim 26, further comprising detecting and recording the change by a recorder of the computer independent of whether a change notification request is received by a broker of the computer.

31. A system, comprising:

a processor of a computer configured to execute a recorder, the recorder configured to detect changes to a file in a file system of the computer and record the changes and times of the changes in a change log of the computer; and a broker of the computer configured to receive a request to deliver a change notification to an external application associated with the computer, and in response to receiving the request, the broker further configured to check the change times of the file and determine whether a frequency of one or more changes to the file exceeds a threshold, the broker further configured to determine whether the change will be processed for a change notification in response to not exceeding the threshold, or whether the changes will be deleted and not processed for the change notification in response to exceeding the threshold, in response to determining that the changes will not be processed for the change notification, the broker further configured to delete the change from the change log, and in response to determining the change will be processed for the change notification, the broker further configured to, determine whether the change notification is one of included in a pathname database of the computer or excluded from the pathname database, and in response to being excluded from the pathname database, resolve a pathname for the change notification;

retrieve the change in the change log in response to resolving the pathname; and distribute the change notification to the external application.

32. The system of claim 31, wherein the recorder operates asynchronously from the broker.

33. The system of claim 31, wherein the broker is configured to distribute the change to the external application before the request is made.

34. The system of claim 31, wherein the broker is further configured to detect changes to one or more files in multiple different file systems.

35. The system of claim 1, wherein the processing logic is further configured to format the change record from a format of the computer system to an application specific format for the external application.

36. The method of claim 13, further comprising:

formatting the change record from a format of the computer to an application specific format for the external application.

37. The system of claim 31, wherein the recorder is further configured to detect and to record the change independent of whether the change notification request is received by the broker.

* * * * *